United States Patent
Allan et al.

(10) Patent No.: US 9,573,839 B2
(45) Date of Patent: Feb. 21, 2017

(54) GLASS WITH IMPROVED TOTAL PITCH STABILITY

(71) Applicant: Corning Incorporated, Corning, NY (US)

(72) Inventors: Douglas Clippinger Allan, Corning, NY (US); Bradley Frederick Bowden, Corning, NY (US); Adam James Ellison, Corning, NY (US); Timothy James Kiczenski, Corning, NY (US); Marcel Potuzak, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/048,452

(22) Filed: Feb. 19, 2016

(65) Prior Publication Data

US 2016/0168013 A1   Jun. 16, 2016

Related U.S. Application Data

(63) Continuation of application No. 14/134,292, filed on Dec. 19, 2013, now Pat. No. 9,051,206.

(60) Provisional application No. 61/740,790, filed on Dec. 21, 2012, provisional application No. 61/909,612, filed on Nov. 27, 2013.

(51) Int. Cl.
   *C03C 3/083* (2006.01)
   *C03C 3/093* (2006.01)
   *C03C 3/087* (2006.01)
   *C03C 3/091* (2006.01)
   *C03B 17/06* (2006.01)

(52) U.S. Cl.
   CPC ............... *C03C 3/093* (2013.01); *C03C 3/087* (2013.01); *C03C 3/091* (2013.01); *C03B 17/06* (2013.01)

(58) Field of Classification Search
   CPC .......... C03C 3/083; C03C 3/085; C03C 3/087; C03C 3/093; C03C 3/078
   USPC ........................................ 501/68, 69, 70, 72
   See application file for complete search history.

(56) References Cited

U.S. PATENT DOCUMENTS

| | | |
|---|---|---|
| 3,338,696 A | 8/1967 | Dockerty |
| 3,682,609 A | 8/1972 | Dockerty |
| 7,833,919 B2 * | 11/2010 | Danielson ............... C03C 3/091 501/64 |
| 8,187,715 B2 | 5/2012 | Danielson et al. |
| 8,713,967 B2 | 5/2014 | Danielson et al. |

(Continued)

FOREIGN PATENT DOCUMENTS

| | | |
|---|---|---|
| JP | 2014118313 A | 6/2014 |
| WO | 2012/103194 A1 | 8/2012 |

OTHER PUBLICATIONS

International Search Report and Written Opinion, dated Jun. 12, 2014, pp. 1-5, International Application No. PCT/US2013/076608, International Filing Date Dec. 19, 2013, European Patent Office, The Netherlands.

*Primary Examiner* — Noah Wiese
(74) *Attorney, Agent, or Firm* — Ryan T. Hardee

(57) ABSTRACT

Described herein are alkali-free, boroalumino silicate glasses exhibiting desirable physical and chemical properties for use as substrates in flat panel display devices, such as, active matrix liquid crystal displays (AMLCDs) and active matrix organic light emitting diode displays (AMO-LEDs). In accordance with certain of its aspects, the glasses possess excellent compaction and stress relaxation properties.

29 Claims, 6 Drawing Sheets

(56) References Cited

U.S. PATENT DOCUMENTS

| | | | |
|---|---|---|---|
| 2006/0003884 A1* | 1/2006 | Nishizawa | C03C 3/091 |
| | | | 501/72 |
| 2007/0191207 A1 | 8/2007 | Danielson et al. | |
| 2009/0286091 A1 | 11/2009 | Danielson et al. | |
| 2010/0126221 A1 | 5/2010 | Danielson et al. | |
| 2010/0129944 A1* | 5/2010 | Shimada | C03C 3/087 |
| | | | 438/27 |
| 2011/0265516 A1 | 11/2011 | Allan et al. | |
| 2012/0088648 A1* | 4/2012 | Ellison | C03C 3/093 |
| | | | 501/59 |
| 2013/0225390 A1 | 8/2013 | Ellison et al. | |
| 2013/0296157 A1 | 11/2013 | Ellison et al. | |
| 2015/0315065 A1 | 11/2015 | Miwa et al. | |

\* cited by examiner

GLASS WITH IMPROVED TOTAL PITCH STABILITY

CROSS-REFERENCE TO RELATED APPLICATIONS

This application is a continuation application of U.S. application Ser. No. 14/134,292, filed on Dec. 19, 2013, now U.S. Pat. No. 9,051,206, which claims the benefit of priority under 35 U.S.C. §119 of U.S. Provisional Application Ser. No. 61/740,790, filed on Dec. 21, 2012, and U.S. Provisional Application Ser. No. 61/909,612 filed on Nov. 27, 2013, the entire contents of each are hereby incorporated by reference.

FIELD

The present disclosure is directed to compositions and methods for making glass sheets capable of use in high performance video and information displays.

BACKGROUND

The production of liquid crystal displays, for example, active matrix liquid crystal display devices (AMLCDs) is very complex, and the properties of the substrate glass are extremely important. First and foremost, the glass substrates used in the production of AMLCD devices need to have their physical dimensions tightly controlled.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which ultimately produces brighter and faster displays. One problem with p-Si based transistors is that their manufacture requires higher process temperatures than those employed in the manufacture of a-Si transistors. These temperatures range from 450° C. to 600° C. compared to the 350° C. peak temperatures typically employed in the manufacture of a-Si transistors. At these temperatures, most AMLCD glass substrates undergo a process known as compaction. Compaction, also referred to as thermal stability or dimensional change, is an irreversible dimensional change (shrinkage) in the glass substrate due to changes in the glass' fictive temperature. "Fictive temperature" is a concept used to indicate the structural state of a glass. Glass that is cooled quickly from a high temperature is said to have a higher fictive temperature because of the "frozen in" higher temperature structure. Glass that is cooled more slowly, or that is annealed by holding for a time near its annealing point, is said to have a lower fictive temperature. When a glass is held at an elevated temperature, the structure is allowed to relax its structure towards the heat treatment temperature. Since the glass substrate's fictive temperature is almost always above the relevant heat treatment temperatures in thin film transistor (TFT) processes, this structural relaxation causes a decrease in fictive temperature which therefore causes the glass to compact (shrink/densify).

It would be advantageous to minimize the level of compaction in the glass because compaction creates possible alignment issues during the display manufacturing process which in turn results in resolution problems in the finished display.

There are several approaches to minimize compaction in glass. One is to thermally pretreat the glass to create a fictive temperature similar to the one the glass will experience during the p-Si TFT manufacture. There are several difficulties with this approach. First, the multiple heating steps employed during the p-Si TFT manufacture create slightly different fictive temperatures in the glass that cannot be fully compensated for by this pretreatment. Second, the thermal stability of the glass becomes closely linked to the details of the p-Si TFT manufacture, which could mean different pretreatments for different end-users. Finally, pretreatment adds to processing costs and complexity.

Another approach is to increase the anneal point of the glass. Glasses with higher anneal will have a higher fictive temperature and will compact less than when subjected to the elevated temperatures associated with panel manufacture. The challenge with this approach, however, is the production of high annealing point glass that is cost effective. The main factors impacting cost are defects and asset lifetime. Higher anneal point glasses typically employ higher operational temperatures during their manufacture thereby reducing the lifetime of the fixed assets associated with glass manufacture.

Yet another approach involves slowing the cooling rate during manufacture. While such an approach has merits, some manufacturing techniques such as the fusion process result in rapid quenching of the glass sheet from the melt and a relatively high temperature structure is "frozen in". While some controlled cooling is possible with such a manufacturing process, it is difficult to control.

SUMMARY

What is disclosed is a glass substrate with exceptional total pitch variability (TPV), as measured by three metrics: (1) compaction in the High Temperature Test Cycle (HTTC) less than 40 ppm, (2) compaction in the Low Temperature Test Cycle (LTTC) less than 5.5 ppm, and (3) stress relaxation rate consistent with less than 50% relaxed in the Stress Relaxation Test Cycle. By satisfying all three criteria with a single glass product, the substrate is assured of being acceptable for the highest resolution TFT cycles. Recent understanding of the underlying physics of glass relaxation has allowed the applicants to disclose glasses that satisfy all three criteria.

The present disclosure describes a glass sheet for use in high performance video or information displays meeting the following performance criteria: compaction in the low temperature test cycle of less than or equal to 5.5 ppm, compaction in the high temperature test cycle of less than or equal to 40 ppm, and less than 50% of an induced stress level in the stress relaxation test cycle. More specifically, the present disclosure provides glass compositions satisfying the above criteria and having a coefficient of thermal expansion compatible with silicon, being substantially alkali-free, arsenic free and antimony free. More specifically, the glasses of the present disclosure further exhibit densities less than 2.6 g/cc, transmission at 300 nm greater than 50% for a 0.5 mm thick sheet, and $(MgO+CaO+SrO+BaO)/Al_2O_3$ less than 1.25.

In accordance with certain of its other aspects, the glasses possess high annealing points and high liquidus viscosities, thus reducing or eliminating the likelihood of devitrification on the forming mandrel. As a result of specific details of their composition, the disclosed glasses melt to good quality with very low levels of gaseous inclusions, and with minimal erosion to precious metals, refractories, and tin oxide electrode materials. Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figure 1:
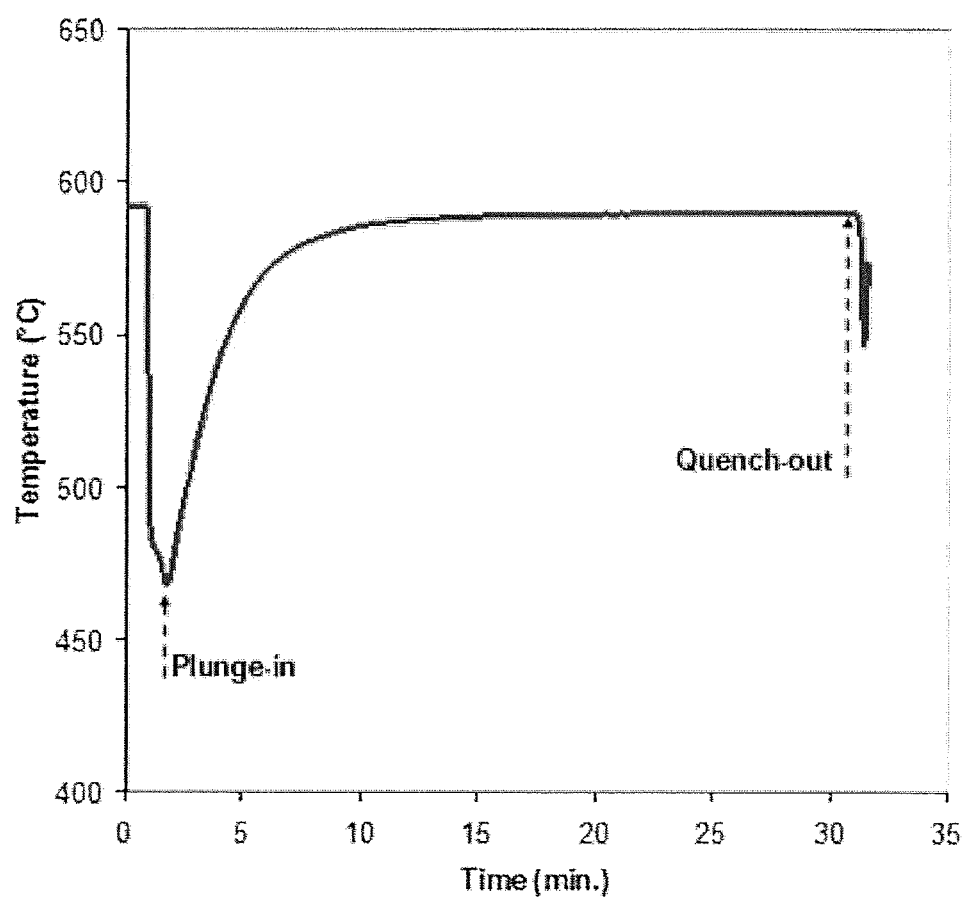
FIG. 1 is a graphical representation of the high thermal temperature cycle as described in the disclosure in terms of temperature over a set time period.

Historically, panel makers have generally made either "large, low resolution" or "small, high resolution" displays. In both of these cases, glasses were held at elevated temperatures, causing the glass substrates to undergo a process known as compaction.

The amount of compaction exhibited by a glass substrate experiencing a given time/temperature profile can be described by the equation $$T_f(t) - T = (T_f(t=0) - T)\exp\left[-\left(\frac{t}{\tau(T)}\right)^b\right]$$

where $T_f(t)$ is the fictive temperature of the glass as a function of time, T is the heat treatment temperature, $T_f(t=0)$ is the initial fictive temperature, b is the "stretching exponent", and $\tau(T)$ is the relaxation time of the glass at the heat treatment temperature. While increasing the heat treatment temperature (T) lowers the "driving force" for compaction (i.e. making "$T_f(t=0)-T$" a smaller quantity), it causes a much larger decrease in the relaxation time $\tau$ of the substrate. Relaxation time varies exponentially with temperature, causing an increase in the amount of compaction in a given time when the temperature is raised.

For the manufacturing of large, low-resolution displays using amorphous silicon (a-Si) based TFTs, the processing temperatures are relatively low (roughly 350° C. or less). These low temperatures, coupled with the loose dimensional stability requirements for low resolution displays, allow the use of low annealing point (T(ann)) glasses with higher fictive temperatures. The annealing point is defined as the temperature where the glass's viscosity is equal to $10^{13.18}$ Poise. T(ann) is used as a simple metric to represent the low temperature viscosity of a glass, defined as the effective viscosity of the glass at a given temperature below the glass transition temperature. A higher "low temperature viscosity" causes a longer relaxation time through the Maxwell relationship $$\tau(T) \approx \frac{\eta(T)}{G}$$

where $\eta$ is the viscosity and G is the shear modulus. Higher performance small, high-resolution displays have generally been made using poly-silicon based (p-Si) TFTs, which employ considerably higher temperatures than a-Si processes. Because of this, either higher annealing point or lower fictive temperature glasses were required to meet the compaction requirements for p-Si based TFTs. Considerable efforts have been made to create higher annealing point glasses compatible with existing manufacturing platforms or improve the thermal history of lower annealing point glasses to enable use in these processes and both paths have been shown to be adequate for previous generations of high performance displays. Recently, however, the p-Si based displays are now being made on even larger "gen size" sheets (many small displays on a single large sheet of glass) and the registry marks are placed much earlier in the TFT process. These two factors have forced the glass substrate to have even better high temperature compaction performance and have caused compaction in lower temperature steps to become a relevant (and perhaps even dominant) source of total pitch variability. Total pitch variability (TPV) refers to the variation in alignment of features (such as registry marks). TPV results from different sources during the processing of a large sheet of glass. As will be shown, adequate high temperature compaction does not necessarily translate to adequate low temperature performance or adequate TPV.

In order to reach higher mobilities in large displays, panel makers have begun making large, high-resolution displays using oxide thin film transistors (OxTFTs). While OxTFT processes are often run with peak temperatures similar to a-Si based TFTs (and often using the same equipment), the resolution requirements are considerably higher, which means low temperature compaction must be considerably improved relative to that of a-Si substrates. In addition to the tight requirements placed on low temperature compaction, the film stresses accumulated in the OxTFT processes have caused stress relaxation in the glass to become a major contributor to the overall TPV.

The applicants have realized that thermal cycles indicate TPV to be the most important description of dimensional stability, which incorporates compaction as well as the stress relaxation component. This coexistence of high and low temperature compaction in the same processes and the introduction of stress relaxation as a key substrate attribute in this new generation of high performance displays has shown all present commercially available substrates to be insufficient. Table 1 discloses glass compositions that can simultaneously manage all three aspects of TPV—low temperature compaction, high temperature compaction and stress relaxation.

Described herein are glasses that are substantially free of alkalis that possess high annealing points and, thus, good dimensional stability (i.e., low compaction) for use as TFT backplane substrates in amorphous silicon, oxide and low-temperature polysilicon TFT processes. The glasses of the present disclosure are capable of managing all three aspects of TPV—low temperature compaction, high temperature compaction and stress relaxation.

A high annealing point glass can prevent panel distortion due to compaction/shrinkage during thermal processing subsequent to manufacturing of the glass. In one embodiment, the disclosed glasses also possess unusually high liquidus viscosity, and thus a significantly reduced risk to devitrification at cold places in the forming apparatus. It is to be understood that while low alkali concentrations are generally desirable, in practice it may be difficult or impossible to economically manufacture glasses that are entirely free of alkalis. The alkalis in question arise as contaminants in raw materials, as minor components in refractories, etc., and can be very difficult to eliminate entirely. Therefore, the disclosed glasses are considered substantially free of alkalis if the total concentration of the alkali elements $Li_2O$, $Na_2O$, and $K_2O$ is less than about 0.1 mole percent (mol %).

In one aspect, the substantially alkali-free glasses have annealing points greater than about 765° C., preferably greater than 775° C., and more preferably greater than 785° C. Such high annealing points result in low rates of relaxation—and hence comparatively small amounts of dimensional change—for the disclosed glass to be used as backplane substrate in a low-temperature polysilicon process. In another aspect, the temperature of the disclosed glasses at a viscosity of about 35,000 poise ($T_{35k}$) is less than about 1310° C. The liquidus temperature of a glass ($T_{liq}$) is the highest temperature above which no crystalline phases can coexist in equilibrium with the glass. In another aspect, the viscosity corresponding to the liquidus temperature of the glass is greater than about 150,000 poise, more preferably greater than 200,000 poise, and most preferably greater than 250,000 poise. In another aspect, the disclosed glass is characterized in that $T_{35k}-T_{liq}>0.25T_{35k}-225°$ C. This ensures minimum tendency to devitrify on the forming mandrel of the fusion process.

In one aspect, the substantially alkali-free glass comprises in mole percent on an oxide basis:
  $SiO_2$ 50-85
  $Al_2O_3$ 0-20
  $B_2O_3$ 0-10
  MgO 0-20
  CaO 0-20
  SrO 0-20
  BaO 0-20
wherein $0.9 \leq (MgO+CaO+SrO+BaO)/Al_2O_3 \leq 3$, where $Al_2O_3$, MgO, CaO, SrO, BaO represent the mole percents of the respective oxide components.

In a further aspect, the substantially alkali-free glass comprises in mole percent on an oxide basis:
  $SiO_2$ 68-74
  $Al_2O_3$ 10-13
  $B_2O_3$ 0-5
  MgO 0-6
  CaO 4-9
  SrO 1-8
  BaO 0-5
wherein $1.05 \leq (MgO+CaO+SrO+BaO)/Al_2O_3 \leq 1.2$, where $Al_2O_3$, MgO, CaO, SrO, BaO represent the mole percents of the respective oxide components.

In one aspect, the disclosed glass includes a chemical fining agent. Such fining agents include, but are not limited to, $SnO_2$, $As_2O_3$, $Sb_2O_3$, F, Cl and Br, and in which the concentrations of the chemical fining agents are kept at a level of 0.5 mol % or less. Chemical fining agents may also include $CeO_2$, $Fe_2O_3$, and other oxides of transition metals, such as $MnO_2$. These oxides may introduce color to the glass via visible absorptions in their final valence state(s) in the glass, and thus their concentration is preferably kept at a level of 0.2 mol % or less.

In one aspect, the disclosed glasses are manufactured into sheet via the fusion process. The fusion draw process results in a pristine, fire-polished glass surface that reduces surface-mediated distortion to high resolution TFT backplanes and color filters. The downdraw sheet drawing processes and, in particular, the fusion process described in U.S. Pat. Nos. 3,338,696 and 3,682,609 (both to Dockerty), which are incorporated by reference, can be used herein. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi.

While the disclosed glasses are compatible with the fusion process, they may also be manufactured into sheets or other ware through less demanding manufacturing processes. Such processes include slot draw, float, rolling, and other sheet-forming processes known to those skilled in the art.

Relative to these alternative methods for creating sheets of glass, the fusion process as discussed above is capable of creating very thin, very flat, very uniform sheets with a pristine surface. Slot draw also can result in a pristine surface, but due to change in orifice shape over time, accumulation of volatile debris at the orifice-glass interface, and the challenge of creating an orifice to deliver truly flat glass, the dimensional uniformity and surface quality of slot-drawn glass are generally inferior to fusion-drawn glass. The float process is capable of delivering very large, uniform sheets, but the surface is substantially compromised by contact with the float bath on one side, and by exposure to condensation products from the float bath on the other side. This means that float glass must be polished for use in high performance display applications.

Unfortunately, and in unlike the float process, the fusion process results in rapid cooling of the glass from high temperature, and this results in a high fictive temperature $T_f$. the fictive temperature can be thought of as representing the discrepancy between the structural state of the glass and the state it would assume if fully relaxed at the temperature of interest. We consider now the consequences of reheating a glass with a glass transition temperature $T_g$ to a process temperature $T_p$ such that $T_p<T_g \leq T_f$. Since $T_p<T_f$, the structural state of the glass is out of equilibrium at $T_p$, and the glass will spontaneously relax toward a structural state that is in equilibrium at $T_p$. The rate of this relaxation scales inversely with the effective viscosity of the glass at $T_p$, such that high viscosity results in a slow rate of relaxation, and a low viscosity results in a fast rate of relaxation. The effective viscosity varies inversely with the fictive temperature of the glass, such that a low fictive temperature results in a high viscosity, and a high fictive temperature results in a comparatively low viscosity. Therefore, the rate of relaxation at $T_p$ scales directly with the fictive temperature of the glass. A process that introduces a high fictive temperature results in a comparatively high rate of relaxation when the glass is reheated at $T_p$.

One means to reduce the rate of relaxation at $T_p$ is to increase the viscosity of the glass at that temperature. The annealing point of a glass represents the temperature at which the glass has a viscosity of $10^{13.2}$ poise. As temperature decreases below the annealing point, the viscosity of the supercooled melt increases. At a fixed temperature below $T_g$, a glass with a higher annealing point has a higher viscosity than a glass with a lower annealing point. Therefore, to increase the viscosity of a substrate glass at $T_p$, one might choose to increase its annealing point. Unfortunately, it is generally the case that the composition changes necessary to increase the annealing point also increase viscosity at all other temperature. In particular, the fictive temperature of a glass made by the fusion process corresponds to a viscosity of about $10^{11}$-$10^{12}$ poise, so an increase in annealing point for a fusion-compatible glass generally increases its fictive temperature as well. For a given glass, higher fictive temperature results in lower viscosity at temperature below $T_g$, and thus increasing fictive temperature works against the viscosity increase that would otherwise be obtained by increasing the annealing point. To see a substantial change in the rate of relaxation at $T_p$, it is generally necessary to make relatively large changes in annealing point. An aspect of the disclosed glass is that it has an annealing point greater than about 765° C., in another aspect greater than 775° C., and in yet another aspect greater than 785° C. Such high annealing points results in acceptably low rates of thermal relaxation during low-temperature TFT processing, e.g., typical low-temperature polysilicon rapid thermal anneal cycles.

In addition to its impact on fictive temperature, increasing annealing point also increases temperatures throughout the melting and forming system, particularly the temperatures on the isopipe as utilized as the forming apparatus in the fusion process. For example, Eagle XG® and Lotus™ (Corning Incorporated, Corning, N.Y.) have annealing points that differ by about 50° C., and the temperature at which they are delivered to the isopipe also differ by about 50° C. When held for extended periods of time above about 1310° C., zircon refractory shows thermal creep, and this can be accelerated by the weight of the isopipe itself plus the weight of the glass on the isopipe. A second aspect of the disclosed glasses is that their delivery temperatures are less than 1310° C. Such delivery temperatures permit extended manufacturing campaigns without replacing the isopipe.

In manufacturing trials of glasses with high annealing points and delivery temperatures below 1310° C., it was discovered that they showed a greater tendency toward devitrification on the root of the isopipe and—especially—the edge directors relative to glasses with lower annealing points. Careful measurement of the temperature profile on the isoipe showed that the edge director temperatures were much lower relative to the center root temperature than had been anticipated due to radiative heat loss. The edge directors typically must be maintained at a temperature below the center root temperature in order to ensure that the glass is viscous enough as it leaves the root that it puts the sheet in between the edge directors under tension, thus maintaining a flat shape. As they are at either end of the isopipe, the edge directors are difficult to heat, and thus the temperature difference between the center of the root and the edge directors may differ by 50° or more.

Since radiative heat loss increases with temperature, and since high annealing point glasses generally are formed at higher temperatures than lower annealing point glasses, the temperature difference between the center root and the edge director generally increases with the annealing point of the glass. This has a direct consequence as regards the tendency of a glass to form devitrification products on the isopipe or edge directors. The liquidus temperature of a glass is defined as the highest temperature at which a crystalline phase would appear if a glass were held indefinitely at that temperature. The liquidus viscosity is the viscosity of a glass at the liquidus temperature. To completely avoid devitrification on an isopipe, it is desirable that the liquidus viscosity be high enough to ensure that glass is no longer on the isopipe refractory or edge director material at or near the liquidus temperature.

In practice, few alkali-free glasses have liquidus viscosities of the desired magnitude. Experience with substrate glasses suitable for amorphous silicon applications (e.g., Eagle XG®) indicated that edge directors could be held continuously at temperatures up to 60° below the liquidus temperature of certain alkali-free glasses. While it was understood that glasses with higher annealing points would require higher forming temperatures, it was not anticipated that the edge directors would be so much cooler relative to the center root temperature. A useful metric for keeping track of this effect is the difference between the delivery temperature onto the isopipe and the liquidus temperature of the glass, $T_{liq}$. In the fusion process, it is generally desirable to deliver glass at about 35,000 poise, and the temperature corresponding to a viscosity of 35,000 poise is conveniently represented as $T_{35k}$. For a particular delivery temperature, it is always desirable to make $T_{35k}$-$T_{liq}$ as large possible, but for an amorphous silicon substrate such as Eagle XG®, it is found that extended manufacturing campaigns can be conducted if $T_{35k}$-$T_{liq}$ is about 80° or more. As temperature increases, $T_{35k}$-$T_{liq}$ must increase as well, such that for $T_{35k}$ near 1300°, it is desirable that $T_{35k}$-$T_{liq}$ at least about 100°. The minimum useful value for $T_{35k}$-$T_{liq}$ varies approximately linearly with temperature from about 1200° C. to about 1320° C., and can be expressed as minimum $T_{35k}$-$T_{liq}$=0.25 $T_{35k}$-225, where all temperatures are in ° C. Thus, a further aspect of the disclosed glass is that $T_{35k}$-$T_{liq}$>0.25$T_{35k}$-225° C.

In addition to this criterion, the fusion process requires a glass with a high liquidus viscosity. This is necessary so as to avoid devitrification products at interfaces with glass and to minimize visible devitrification products in the final glass. For a given glass compatible with fusion for a particular sheet size and thickness, adjusting the process so as to manufacture wider sheet or thicker sheet generally results in lower temperatures at either end of the isopipe (the forming mandrel for the fusion process). Thus, disclosed glasses with higher liquidus viscosities provide greater flexibility for manufacturing via the fusion process.

In tests of the relationship between liquidus viscosity and subsequent devitrification tendencies in the fusion process, it has been observed that high delivery temperatures such as those of the disclosed glasses generally require higher liquidus viscosities for long-term production than would be the case for typical AMLCD substrate compositions with lower annealing points. While not wishing to be bound by theory, this requirement appears to arise from accelerated rates of crystal growth as temperature increases. Fusion is essentially an isoviscous process, so a more viscous glass at some fixed temperature must be formed by fusion at higher temperature than a less viscous glass. While some degree of undercooling (cooling below the liquidus temperature) can be sustained for extended periods in a glass at lower temperature, crystal growth rates increase with temperature, and thus more viscous glasses grow an equivalent, unacceptable amount of devitrification products in a shorter period of time than less viscous glasses. Depending on where they form, devitrification products can compromise forming stability, and introduce visible defects into the final glass.

To be formed by the fusion process, it is desirable that the disclosed glass compositions have a liquidus viscosity greater than or equal to 200,000 poises, more preferably greater than or equal to 250,000 poises, higher liquidus viscosities being preferable. A surprising result is that throughout the range of the disclosed glasses, it is possible to obtain a liquidus temperature low enough, and a viscosity high enough, such that the liquidus viscosity of the glass is unusually high compared to compositions outside of the disclosed range.

Of course, the present disclosure is not limited to use with the fusion process and accordingly for the float process, the liquidus viscosity conditions as well as other fusion specific criteria described above would not be necessary, thereby extending the composition windows for those processes.

In the glass compositions described herein, $SiO_2$ serves as the basic glass former. The $SiO_2$ content may be from 50-80 mole percent. In certain aspects, the concentration of $SiO_2$ can be greater than 68 mole percent in order to provide the glass with a density and chemical durability suitable for a flat panel display glass (e.g., an AMLCD glass), and a liquidus temperature (liquidus viscosity), which allows the glass to be formed by a downdraw process (e.g., a fusion process). In one embodiment, the $SiO_2$ concentration may be less than or equal to about 74 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,725° C. In one aspect, the $SiO_2$ concentration is between 70 and 73 mole percent.

$Al_2O_3$ is another glass former used to make the glasses described herein. In one embodiment, the $Al_2O_3$ concentration is 0-20 mole percent. In another embodiment and as a consideration for glasses made by the fusion process, an $Al_2O_3$ concentration greater than or equal to 10 mole percent provides the glass with a low liquidus temperature and high viscosity, resulting in a high liquidus viscosity. The use of at least 10 mole percent $Al_2O_3$ also improves the glass's annealing point and modulus. For embodiments having the ratio $(MgO+CaO+SrO+BaO)/Al_2O_3$ greater than or equal to 1.05, it is desirable to keep the $Al_2O_3$ concentration below about 13 mole percent. In one aspect, the $Al_2O_3$ concentration is between 10 and 13 mole percent.

$B_2O_3$ is both a glass former and a flux that aids melting and lowers the melting temperature. Its impact on liquidus temperature is at least as great as its impact on viscosity, so increasing $B_2O_3$ can be used to increase the liquidus viscosity of a glass. In one embodiment, the $B_2O_3$ content is 0-10 mole percent, and in another embodiment between 0-6 mole percent. In another embodiment, the glass compositions described herein have $B_2O_3$ concentrations that are equal to or greater than 1 mole percent. As discussed above with regard to $SiO_2$, glass durability is very important for LCD applications. Durability can be controlled somewhat by elevated concentrations of alkaline earth oxides, and significantly reduced by elevated $B_2O_3$ content. Annealing point decreases as $B_2O_3$ increases, so it is desirable to keep $B_2O_3$ content low relative to its typical concentration in amorphous silicon substrates. Thus in one aspect, the glasses described herein have $B_2O_3$ concentrations that are between 1 and 5 mole percent. In another aspect, the glasses have a $B_2O_3$ content between 2 and 4.5 mol percent. In yet another aspect, the glasses of the present invention have a $B_2O_3$ content of between 2.5 and 4.5 mol percent.

The $Al_2O_3$ and $B_2O_3$ concentrations can be selected as a pair to increase annealing point, increase modulus, improve durability, reduce density, and reduce the coefficient of thermal expansion (CTE), while maintaining the melting and forming properties of the glass.

For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing annealing point, modulus, and durability, provided that in some embodiments where $(MgO+CaO+SrO+BaO)/Al_2O_3$ control is sought, increase in $Al_2O_3$ does not reduce the $(MgO+CaO+SrO+BaO)/Al_2O_3$ ratio below about 0.9 in one embodiment and 1.05 in another embodiment. For $(MgO+CaO+SrO+BaO)/Al_2O_3$ ratios below about 1.0, it may be difficult or impossible to remove gaseous inclusions from the glass due to late-stage melting of the silica raw material. Furthermore, when $(MgO+CaO+SrO+BaO)/Al_2O_3 \le 1.05$, mullite, an aluminosilicate crystal, can appear as a liquidus phase. Once mullite is present as a liquidus phase, the composition sensitivity of liquidus increases considerably, and mullite devitrification products both grow very quickly and are very difficult to remove once established. Thus in one aspect, the glasses described herein have $(MgO+CaO+SrO+BaO)/Al_2O_3 \ge 1.05$. An upper end of $(MgO+CaO+SrO+BaO)/Al_2O_3$ may be as high as 3, depending on the forming process, but in one embodiment and as described immediately below, are less than or equal to 1.2. In another embodiment, less than or equal to 1.6; and in yet another embodiment, less than or equal to 1.4.

In addition to the glass formers ($SiO_2$, $Al_2O_3$, and $B_2O_3$), the glasses described herein also include alkaline earth oxides. In one aspect, at least three alkaline earth oxides are part of the glass composition, e.g., MgO, CaO, and BaO, and, optionally, SrO. The alkaline earth oxides provide the glass with various properties important to melting, fining, forming, and ultimate use. Accordingly, to improve glass performance in these regards, in one aspect, the $(MgO+CaO+SrO+BaO)/Al_2O_3$ ratio is greater than or equal to 1.05. As this ratio increases, viscosity tends to increase more strongly than liquidus temperature, and thus it is increasingly difficult to obtain suitably high values for $T_{35k}-T_{liq}$. Thus in another aspect, ratio $(MgO+CaO+SrO+BaO)/Al_2O_3$ is less than or equal to 1.2.

For certain embodiments of this invention, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities. In this sense, the addition of small amounts of MgO benefits melting by reducing melting temperatures, benefits forming by reducing liquidus temperatures and increasing liquidus viscosity, while preserving high annealing point and, thus, low compaction.

Glasses for use in AMLCD applications should have CTEs (0-300° C.) in the range of $28\text{-}42\times10^{-7}/°$ C., preferably, $30\text{-}40\times10^{-7}/°$ C., and more preferably, $32\text{-}38\times10^{-7}/°$ C., or in other embodiments $33\text{-}37\times10^{-7}/°$ C. For certain applications, density is important as weight of the final display may be an important attribute.

Calcium oxide present in the glass composition can produce low liquidus temperatures (high liquidus viscosities), high annealing points and moduli, and CTE's in the most desired ranges for flat panel applications, specifically, AMLCD applications. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one aspect, the CaO concentration can be greater than or equal 0 to 20 mole percent. In another aspect, the CaO concentration of the glass composition is between about 4 and 9 mole percent. In another aspect, the CaO concentration of the glass composition is between about 4.5 and 6 mole percent.

SrO and BaO can both contribute to low liquidus temperatures (high liquidus viscosities) and, thus, the glasses described herein will typically contain at least both of these oxides. However, the selection and concentration of these oxides are selected in order to avoid an increase in CTE and density and a decrease in modulus and annealing point. For glasses made by a downdraw process, the relative proportions of SrO and BaO can be balanced so as to obtain a suitable combination of physical properties and liquidus viscosity.

On top of these considerations, the glasses are preferably formable by a downdraw process, e.g., a fusion process, which means that the glass' liquidus viscosity needs to be relatively high. Individual alkaline earths play an important role in this regard since they can destabilize the crystalline phases that would otherwise form. BaO and SrO are particularly effective in controlling the liquidus viscosity and are included in the glasses of the invention for at least this purpose. As illustrated in the examples presented below, various combinations of the alkaline earths will produce glasses having high liquidus viscosities, with the total of the alkaline earths satisfying the $RO/Al_2O_3$ ratio constraints needed to achieve low melting temperatures, high annealing points, and suitable CTE's.

The glass compositions are generally alkali free; however, the glasses can contain some alkali contaminants. In the case of AMLCD applications, it is desirable to keep the alkali levels below 0.1 mole percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In one aspect, the total alkali concentration is less than or equal to 0.1 mole percent.

On an oxide basis, the glass compositions described herein can have one or more or all of the following compositional characteristics: (i) an $As_2O_3$ concentration of at most 0.05 mole percent; (ii) an $Sb_2O_3$ concentration of at most 0.05 mole percent; (iii) a $SnO_2$ concentration of at most 0.25 mole percent.

$As_2O_3$ is an effective high temperature fining agent for AMLCD glasses, and in some aspects described herein, $As_2O_3$ is used for fining because of its superior fining properties. However, $As_2O_3$ is poisonous and requires special handling during the glass manufacturing process. Accordingly, in certain aspects, fining is performed without the use of substantial amounts of $As_2O_3$, i.e., the finished glass has at most 0.05 mole percent $As_2O_3$. In one aspect, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain aspects, fining is performed without the use of substantial amounts of $Sb_2O_3$, i.e., the finished glass has at most 0.05 mole percent $Sb_2O_3$. In another aspect, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects in the use of these glasses in the manufacture of liquid crystal displays. However, high concentrations of $SnO_2$ are not preferred as this can result in the formation of crystalline defects in AMLCD glasses. In one aspect, the concentration of $SnO_2$ in the finished glass is less than or equal to 0.25 mole percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain aspects, maintaining the $(MgO+CaO+SrO+BaO)/Al_2O_3$ ratio and individual alkaline earth concentrations within the ranges discussed above makes the fining process easier to perform and more effective.

As described, the glasses described herein can be manufactured using various techniques known in the art. In one aspect, the glasses are made using a manufacturing process by which a population of 50 sequential glass sheets are produced from the melted and fined batch materials and has an average gaseous inclusion level of less than 0.10 gaseous inclusions/cubic centimeter, where each sheet in the population has a volume of at least 500 cubic centimeters.

In one embodiment, the glasses of the present disclosure exhibit transmission at 300 nm of greater than 50% for a 0.5 mm thick article. In another embodiment, the glasses of the present disclosure exhibit transmission at 300 nm of greater than 60% for a 0.5 mm thick article. In one embodiment, the glasses of the present disclosure exhibit densities of between 2.3 and 2.6 g/cc. In another embodiment, the glasses of the present disclosure exhibit densities of less than 2.58 g/cc. In one embodiment, the glass articles of the present invention exhibit an internal fusion line indicating their method of manufacture by a fusion downdraw process. In one embodiment, the Young's modulus is between 70-90 GPa. In another embodiment, the Young's modulus is between 75-85 GPa.

In one embodiment, the glasses of the present disclosure will have a CTE less than $36 \times 10^{-7}/°$ C., a density less than 2.6 g/cc, at 200 poise temperature of less than 1700° C., a $T_{35k}$ of less than 1350° C., and $T_{35k}-T_{liq}$ greater than 100° C.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in Table 1 were determined in accordance with techniques conventional in the glass art. Thus, the linear coefficient of thermal expansion (CTE) over the temperature range 25-300° C. is expressed in terms of $\times 10^{-7}/°$ C. and the annealing point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The temperature corresponding to 200 poise and the viscosity at the liquidus (in poises) were determined from fits to high viscosity data using the Vogel-Fulcher-Tammann equation, $$\log(\eta)=A+B/(T-T_o)$$

in which T is temperature and A, B and $T_o$ are fitting parameters. To determine liquidus viscosity, the liquidus temperature is used as the value for T. Young's modulus values in terms of GPa were determined using a resonant ultrasonic spectroscopy technique of the general type set forth in ASTM E1875-00e1.

As can be seen in Table 1, the exemplary glasses have density, CTE, annealing point and Young's modulus values that make the glasses suitable for display applications, such as AMLCD substrate applications, and more particularly for low-temperature polysilicon and oxide thin film transistor applications. Although not shown in Table 1, the glasses have durabilities in acid and base media that are similar to those obtained from commercial AMLCD substrates, and thus are appropriate for AMLCD applications. The exemplary glasses can be formed using downdraw techniques, and in particular are compatible with the fusion process, via the aforementioned criteria.

The exemplary glasses of Table 1 were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO barium carbonate was the source for BaO, and tin (IV) oxide was the source for $SnO_2$. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of Table 1 can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing the disclosed glass include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in Table 1 contain $SnO_2$ as a fining agent, but other chemical fining agents could also be employed to obtain glass of sufficient quality for TFT substrate applications. For example, the disclosed glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into the disclosed glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions. As a further example, alkalis may be present as a tramp component at levels up to about 0.1 mol % for the combined concentration of $Li_2O$, $Na_2O$ and $K_2O$.

Hydrogen is inevitably present in the form of the hydroxyl anion, $OH^-$, and its presence can be ascertained via standard infrared spectroscopy techniques. Dissolved hydroxyl ions significantly and nonlinearly impact the annealing point of the disclosed glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^=$) dissolved in the glass. The elevated barium concentrations of the disclosed glasses appear to increase sulfur retention in the glass in early stages of melting, but as noted above, barium is required to obtain low liquidus temperature, and hence high $T_{35k}-T_{liq}$ and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of the disclosed glasses to form $SO_2$ blisters. While not wishing to be bound to theory, these elements behave as potential electron donors that suppress the electromotive force for sulfate reduction. Sulfate reduction can be written in terms of a half reaction such as

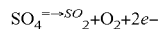
$SO_4^= \rightarrow SO_2 + O_2 + 2e-$ where e– denotes an electron. The "equilibrium constant" for the half reaction is

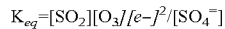
$K_{eq} = [SO_2][O_2][e-]^2/[SO_4^=]$ where the brackets denote chemical activities. Ideally one would like to force the reaction so as to create sulfate from $SO_2$, $O_2$ and 2e–. Adding nitrates, peroxides, or other oxygen-rich raw materials may help, but also may work against sulfate reduction in the early stages of melting, which may counteract the benefits of adding them in the first place. $SO_2$ has very low solubility in most glasses, and on is impractical to add to the glass inciting process. Electrons may be "added" through reduced multivalents. For example, an appropriate electron-donating half reaction for ferrous iron ($Fe^{2+}$) is expressed as

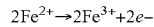
$2Fe^{2+} \rightarrow 2Fe^{3+} + 2e-$

This "activity" of electrons can force the sulfate reduction reaction to the left, stabilizing $SO_4^=$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of the disclosed glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In a preferred embodiment, the concentration of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, optical or viscoelastic properties. Such oxides include, but are not limited to, $TiO_2$, $ZrO_2$, $HfO_2$, $Nb_2O_5$, $Ta_2O_5$, $MoO_3$, $WO_3$, ZnO, $In_2O_3$, $Ga_2O_3$, $Bi_2O_3$, $GeO_2$, PbO, $SeO_3$, $TeO_2$, $Y_2O_3$, $La_2O_3$, $Gd_2O_3$, and others known to those skilled in the art. Through an iterative process of adjusting the relative proportions of the major oxide components of the disclosed glasses, such colorless oxides can be added to a level of up to about 2 mol % without unacceptable impact to annealing point, $T_{35k}-T_{liq}$ or liquidus viscosity.

TABLE 1

| | | Batch Material | 1 | 2 | 3 | 4 |
|---|---|---|---|---|---|---|
| | | SiO$_2$ | 72.88 | 71.93 | 71.92 | 70.82 |
| | | Al$_2$O$_3$ | 10.18 | 11.06 | 11.21 | 12.27 |
| | | B$_2$O$_3$ | 5.03 | 4.62 | 4.48 | 4.9 |
| | | MgO | 0.1 | 1.51 | 1.59 | 2.12 |
| | | CaO | 4.5 | 4.91 | 4.92 | 4.98 |
| | | SrO | 7.14 | 5.82 | 5.71 | 4.78 |
| | | BaO | 0.07 | 0.06 | 0.07 | 0.05 |
| | | SnO$_2$ | 0.07 | 0.07 | 0.08 | 0.07 |
| | | Fe$_2$O$_3$ | 0.01 | 0.01 | 0.01 | 0.01 |
| | | ZrO$_2$ | 0.01 | 0.01 | 0.01 | 0 |
| | | As$_2$O$_3$ | | | | |
| | | RO/Al$_2$O$_3$ | 1.16 | 1.11 | 1.10 | 0.97 |
| | Properties | density | 2.514 | 2.509 | 2.505 | 2.494 |
| | | strain-BBV | 712.6 | 719.4 | 723.2 | 724.4 |
| | | anneal-BBV | 767.2 | 773.4 | 776.6 | 777.5 |
| | | softening point (PPV) | 1025.1 | 1024.1 | 1028 | 1023.8 |
| | | CTE (0-300) cooling | 36.6 | 35.9 | 35 | 33.2 |
| | | Poisson's ratio | | 0.238 | 0.233 | 0.233 |
| | | Shear modulus (Mpsi) | | 4.556 | 4.574 | 4.624 |
| GPa per Mpsi | | Young's modulus (Mpsi) | | 11.284 | 11.281 | 11.406 |
| 6.8947573 | | Youngs mod (GPa) | | 77.8 | 77.8 | 78.6 |
| | | Specific modulus (Gpa/density) | | 31.0 | 31.0 | 31.5 |
| | Viscosity | A | | −3.460 | −3.515 | −3.540 |
| | | B | | 8151.30 | 8164.10 | 8018.80 |
| | | To | | 284.90 | 288.90 | 299.80 |
| 200 | | 200p | | 1700 | 1693 | 1673 |
| 700 | | 700p | | 1578 | 1573 | 1556 |
| 2000 | | 2kp | | 1491 | 1487 | 1472 |
| 20000 | | 20kp | | 1335 | 1333 | 1322 |
| 35000 | | 35kp | | 1303 | 1302 | 1292 |
| 200000 | | 200kp | | 1215 | 1215 | 1207 |
| Liquidus-72 h | | internal | 1180 | 1190 | 1190 | 1195 |
| | | phase | Crist | Cristobalite | Cristobalite | Mullite |
| | | second phase | | | | |
| | | 72 h liquidus viscosity (int) | | 3.5E+05 | 3.5E+05 | 2.6E+05 |

| | | Batch Material | 5 | 6 | 7 | 8 |
|---|---|---|---|---|---|---|
| | | SiO$_2$ | 70.99 | 72.03 | 71.45 | 71.18 |
| | | Al$_2$O$_3$ | 12.02 | 12.31 | 12.36 | 12.38 |
| | | B$_2$O$_3$ | 4.73 | 1.87 | 1.84 | 1.97 |
| | | MgO | 2.93 | 3.94 | 5.1 | 4.35 |
| | | CaO | 4.97 | 5.34 | 5.59 | 6.09 |
| | | SrO | 4.24 | 4.34 | 3.49 | 3.85 |
| | | BaO | 0.03 | 0.04 | 0.02 | 0.03 |
| | | SnO$_2$ | 0.07 | 0.09 | 0.11 | 0.1 |
| | | Fe$_2$O$_3$ | 0.01 | 0.02 | 0.01 | 0.01 |
| | | ZrO$_2$ | 0 | 0.02 | 0.02 | 0.02 |
| | | As$_2$O$_3$ | | | | |
| | | RO/Al$_2$O$_3$ | 1.01 | 1.11 | 1.15 | 1.16 |
| | Properties | density | 2.488 | 2.523 | 2.518 | 2.526 |
| | | strain-BBV | 722.8 | 748.9 | 748 | 748.2 |
| | | anneal-BBV | 777 | 802 | 799.3 | 799.8 |
| | | softening point (PPV) | 1021.1 | 1043.6 | 1034 | 1034.4 |
| | | CTE (0-300) cooling | | | 34 | 34.5 |
| | | Poisson's ratio | 0.234 | 0.237 | 0.221 | 0.229 |
| | | Shear modulus (Mpsi) | 4.656 | 4.898 | 4.968 | 4.936 |
| GPa per Mpsi | | Young's modulus (Mpsi) | 11.494 | 12.121 | 12.134 | 12.131 |
| 6.8947573 | | Youngs mod (GPa) | 79.2 | 83.6 | 83.7 | 83.6 |
| | | Specific modulus (Gpa/density) | 31.9 | 33.1 | 33.2 | 33.1 |
| | Viscosity | A | −3.339 | −3.440 | −3.135 | −3.138 |
| | | B | 7567.50 | 7683.50 | 6971.90 | 7013.90 |
| | | To | 326.00 | 345.00 | 379.60 | 377.50 |
| 200 | | 200p | 1668 | 1683 | 1665 | 1669 |
| 700 | | 700p | 1550 | 1567 | 1546 | 1551 |
| 2000 | | 2kp | 1466 | 1485 | 1463 | 1467 |
| 20000 | | 20kp | 1317 | 1338 | 1316 | 1320 |
| 35000 | | 35kp | 1286 | 1307 | 1287 | 1290 |
| 200000 | | 200kp | 1202 | 1224 | 1205 | 1208 |
| Liquidus-72 h | | internal | 1190 | 1240 | 1245 | 1240 |
| | | phase | Cristobalite | Cristobalite | Cristobalite | Cristobalite |
| | | second phase | | | | Anorthite |
| | | 72 h liquidus viscosity (int) | 2.6E+05 | 1.4E+05 | 8.3E+04 | 9.9E+04 |

TABLE 1-continued

| | Batch Material | 9 | 10 | 11 | 12 |
|---|---|---|---|---|---|
| | $SiO_2$ | 71.24 | 71.67 | 70.47 | 72.42 |
| | $Al_2O_3$ | 12.38 | 11.34 | 11.75 | 11.07 |
| | $B_2O_3$ | 1.82 | 3.34 | 5.01 | 3.06 |
| | MgO | 5.7 | 2.96 | 2.9 | 3.54 |
| | CaO | 5.55 | 8.43 | 5.45 | 7.38 |
| | SrO | 3.15 | 2.11 | 4.28 | 2.37 |
| | BaO | 0.03 | 0.02 | 0.04 | 0.02 |
| | $SnO_2$ | 0.11 | 0.12 | 0.07 | 0.11 |
| | $Fe_2O_3$ | 0.01 | 0.02 | 0.01 | 0.01 |
| | $ZrO_2$ | 0.02 | 0 | 0.01 | 0.01 |
| | $As_2O_3$ | | | | |
| | $RO/Al_2O_3$ | 1.17 | 1.19 | 1.08 | 1.20 |
| Properties | density | 2.514 | 2.476 | 2.49 | 2.471 |
| | strain-BBV | 744.7 | 728.4 | 716.6 | 732.9 |
| | anneal-BBV | 795.7 | 781.8 | 770.6 | 785.3 |
| | softening point (PPV) | 1030 | 1017.6 | 1012.4 | 1025.3 |
| | CTE (0-300) cooling | 35 | 33.9 | 33.9 | |
| | Poisson's ratio | 0.234 | 0.219 | 0.201 | 0.222 |
| | Shear modulus (Mpsi) | 4.979 | 4.844 | 4.68 | 4.807 |
| GPa per Mpsi | Young's modulus (Mpsi) | 12.284 | 11.812 | 11.238 | 11.743 |
| 6.8947573 | Youngs mod (GPa) | 84.7 | 81.4 | 77.5 | 81.0 |
| | Specific modulus (Gpa/density) | 33.7 | 32.9 | 31.1 | 32.8 |
| Viscosity | A | −3.106 | −2.948 | −3.365 | −2.844 |
| | B | 6924.50 | 6833.70 | 7612.50 | 6833.00 |
| | To | 378.70 | 368.60 | 316.30 | 367.60 |
| 200 | 200p | 1659 | 1670 | 1660 | 1696 |
| 700 | 700p | 1542 | 1548 | 1542 | 1569 |
| 2000 | 2kp | 1459 | 1462 | 1458 | 1480 |
| 20000 | 20kp | 1314 | 1311 | 1309 | 1324 |
| 35000 | 35kp | 1284 | 1281 | 1279 | 1292 |
| 200000 | 200kp | 1202 | 1197 | 1195 | 1207 |
| Liquidus-72 h | internal | 1250 | 1245 | 1190 | 1270 |
| | phase | Cristobalite | Cristobalite | Cristobalite | Cristobalite |
| | second phase | | | | |
| | 72 h liquidus viscosity (int) | 6.9E+04 | 7.1E+04 | 2.2E+05 | 5.3E+04 |

| | Batch Material | 13 | 14 | 15 | 16 |
|---|---|---|---|---|---|
| | $SiO_2$ | 71.21 | 72.32 | 72.66 | 73.9 |
| | $Al_2O_3$ | 11.52 | 12.82 | 12.65 | 10.86 |
| | $B_2O_3$ | 4.77 | 0 | 0 | 3.14 |
| | MgO | 1.76 | 5.65 | 4.88 | 2.17 |
| | CaO | 4.99 | 5.57 | 5.75 | 6.68 |
| | SrO | 5.62 | 3.5 | 3.91 | 3.1 |
| | BaO | 0.06 | 0.03 | 0.03 | 0.03 |
| | $SnO_2$ | 0.07 | 0.1 | 0.1 | 0.11 |
| | $Fe_2O_3$ | 0.01 | 0.01 | 0.01 | 0.01 |
| | $ZrO_2$ | 0 | 0.01 | 0 | 0.01 |
| | $As_2O_3$ | | | | |
| | $RO/Al_2O_3$ | 1.08 | 1.15 | 1.15 | 1.10 |
| Properties | density | 2.508 | 2.537 | 2.541 | 2.47 |
| | strain-BBV | 714.6 | 785.5 | 775.9 | 739.2 |
| | anneal-BBV | 769.3 | 837.5 | 825.9 | 793.8 |
| | softening point (PPV) | 1014.4 | 1068.5 | 1047.6 | 1040.1 |
| | CTE (0-300) cooling | 34.9 | 35.3 | 34.8 | |
| | Poisson's ratio | 0.229 | 0.218 | 0.226 | 0.221 |
| | Shear modulus (Mpsi) | 4.579 | 5.047 | 5.123 | 4.727 |
| GPa per Mpsi | Young's modulus (Mpsi) | 11.258 | 12.299 | 12.562 | 11.538 |
| 6.8947573 | Youngs mod (GPa) | 77.6 | 84.8 | 86.6 | 79.6 |
| | Specific modulus (Gpa/density) | 30.9 | 33.4 | 34.1 | 32.2 |
| Viscosity | A | −3.413 | −2.508 | −2.721 | −3.050 |
| | B | 7814.10 | 5771.50 | 6345.70 | 7393.00 |
| | To | 304.40 | 484.80 | 435.80 | 345.50 |
| 200 | 200p | 1672 | 1685 | 1699 | 1727 |
| 700 | 700p | 1553 | 1563 | 1576 | 1600 |
| 2000 | 2kp | 1468 | 1478 | 1490 | 1510 |
| 20000 | 20kp | 1317 | 1332 | 1339 | 1351 |
| 35000 | 35kp | 1286 | 1303 | 1309 | 1319 |
| 200000 | 200kp | 1201 | 1224 | 1227 | 1231 |
| Liquidus-72 h | internal | 1170 | 1270 | 1260 | 1275 |
| | phase | Cristobalite | Cristobalite | Cristobalite | Cristobalite |
| | second phase | | | | |
| | 72 h liquidus viscosity (int) | 4.1E+05 | 7.0E+04 | 9.5E+04 | 8.0E+04 |

| | Batch Material | 17 | 18 | 19 | 20 |
|---|---|---|---|---|---|
| | $SiO_2$ | 68.11 | 71.23 | 72.2 | 70.74 |
| | $Al_2O_3$ | 12.72 | 12.41 | 12.49 | 13 |

TABLE 1-continued

|  |  |  |  |  |  |
|---|---|---|---|---|---|
|  | B$_2$O$_3$ | 4.5 | 2.54 | 0.95 | 2.48 |
|  | MgO | 4.38 | 3.62 | 4.5 | 3.35 |
|  | CaO | 6.44 | 5.23 | 5.58 | 4.58 |
|  | SrO | 3.7 | 1.42 | 3.16 | 1.43 |
|  | BaO | 0.02 | 3.43 | 1.01 | 4.28 |
|  | SnO$_2$ | 0.09 | 0.1 | 0.09 | 0.1 |
|  | Fe$_2$O$_3$ | 0.01 | 0.01 | 0.01 | 0.01 |
|  | ZrO$_2$ | 0.03 | 0.01 | 0.01 | 0.02 |
|  | As$_2$O$_3$ |  |  |  |  |
|  | RO/Al$_2$O$_3$ | 1.14 | 1.10 | 1.14 | 1.05 |
| Properties | density | 2.517 | 2.57 | 2.548 | 2.605 |
|  | strain-BBV | 720.7 | 743.3 | 759.8 | 743.1 |
|  | anneal-BBV | 771.6 | 798.2 | 810.9 | 795.9 |
|  | softening point (PPV) | 996.1 | 1043.7 | 1050.1 | 1043.1 |
|  | CTE (0-300) cooling | 34.3 | 34.9 | 36.7 | 36.4 |
|  | Poisson's ratio | 0.234 | 0.234 | 0.238 | 0.219 |
|  | Shear modulus (Mpsi) | 4.805 | 4.757 | 4.968 | 4.802 |
| GPa per Mpsi | Young's modulus (Mpsi) | 11.86 | 11.746 | 12.3 | 11.708 |
| 6.8947573 | Youngs mod (GPa) | 81.8 | 81.0 | 84.8 | 80.7 |
|  | Specific modulus (Gpa/density) | 32.5 | 31.5 | 33.3 | 31.0 |
| Viscosity | A | −2.879 | −3.526 | −3.374 | −3.612 |
|  | B | 6338.60 | 7900.35 | 7576.99 | 8055.85 |
|  | To | 389.30 | 330.76 | 356.08 | 318.86 |
| 200 | 200p | 1613 | 1687 | 1691 | 1681 |
| 700 | 700p | 1497 | 1571 | 1574 | 1566 |
| 2000 | 2kp | 1415 | 1488 | 1491 | 1484 |
| 20000 | 20kp | 1272 | 1340 | 1343 | 1337 |
| 35000 | 35kp | 1243 | 1310 | 1313 | 1307 |
| 200000 | 200kp | 1164 | 1226 | 1230 | 1223 |
| Liquidus-72 h | internal | 1185 | 1195 | 1260 | 1190 |
|  | phase | anorthite | Cristobalite | Cristobalite | mullite |
|  | second phase |  |  |  |  |
|  | 72 h liquidus viscosity (int) | 1.2E+05 | 4.1E+05 | 1.0E+05 | 4.3E+05 |

|  | Batch Material | 21 | 22 | 23 | 24 |
|---|---|---|---|---|---|
|  | SiO$_2$ | 72.16 | 72.29 | 70.62 | 71.68 |
|  | Al$_2$O$_3$ | 11.86 | 11.6 | 13.09 | 12.38 |
|  | B$_2$O$_3$ | 0 | 0 | 1.5 | 0.76 |
|  | MgO | 5.53 | 4.83 | 4.84 | 4.99 |
|  | CaO | 5.4 | 5.95 | 5.75 | 5.29 |
|  | SrO | 1.59 | 0.99 | 1.52 | 1.47 |
|  | BaO | 3.31 | 4.18 | 2.58 | 3.36 |
|  | SnO$_2$ | 0.11 | 0.11 | 0.08 | 0.08 |
|  | Fe$_2$O$_3$ | 0.02 | 0.02 | 0.01 |  |
|  | ZrO$_2$ | 0.02 | 0.02 | 0.02 |  |
|  | As$_2$O$_3$ |  |  |  |  |
|  | RO/Al$_2$O$_3$ | 1.33 | 1.38 | 1.12 |  |
| Properties | density | 2.616 | 2.604 | 2.575 |  |
|  | strain-BBV | 764 | 762 | 752 |  |
|  | anneal-BBV | 816 | 817 | 805 |  |
|  | softening point (PPV) | 1050.7 | 1057.8 | 1041.3 |  |
|  | CTE (0-300) cooling | 36.7 | 34.9 | 34.6 |  |
|  | Poisson's ratio |  |  |  |  |
|  | Shear modulus (Mpsi) |  |  |  |  |
| GPa per Mpsi | Young's modulus (Mpsi) |  |  |  |  |
| 6.8947573 | Youngs mod (GPa) | 84.8 | 83.6 | 84.1 |  |
|  | Specific modulus (Gpa/density) |  |  |  |  |
| Viscosity | A | −3.02159 | −2.98998 | −3.10916 |  |
|  | B | 6981.809 | 6990.12 | 6956.355 |  |
|  | To | 386.1695 | 387.4732 | 383.4808 |  |
| 200 | 200p | 1698 | 1709 | 1669 |  |
| 700 | 700p | 1576 | 1585 | 1552 |  |
| 2000 | 2kp |  |  |  |  |
| 20000 | 20kp |  |  |  |  |
| 35000 | 35kp | 1309 | 1315 | 1292 |  |
| 200000 | 200kp |  |  |  |  |
| Liquidus-72 h | internal | 1210 | 1210 | 1190 |  |
|  | phase |  |  |  |  |
|  | second phase |  |  |  |  |
|  | 72 h liquidus viscosity (int) |  |  |  |  |

What is disclosed is a glass substrate with exceptional total pitch variability (TPV), as measured by three metrics: (1) compaction in the High Temperature Test Cycle (HTTC) less than 40 ppm, (2) compaction in the Low Temperature Test Cycle (LTTC) less than 5.5 ppm, and (3) stress relaxation rate consistent with less than 50% relaxed in the Stress Relaxation Test Cycle (SRTC). By satisfying all three criteria, the substrate is assured of being acceptable for the highest resolution TFT cycles. A brief description of these test cycles follows:

High Temperature Test Cycle (HTTC)

The samples were heat treated in a box furnace according to the thermal profile shown in FIG. 1. First, the furnace was preheated to slightly above 590° C. The stack of five samples was then plunged into the furnace through a small slit in the front of the furnace. After thirty minutes the samples are quenched out of the furnace into ambient air. The total time the samples reside at the peak temperature 590° C. is about 18 minutes. For purposes of this disclosure, this test criteria shall be defined as high temperature test cycle or HTTC. In one embodiment, the HTTC compaction is less than or equal to 40 ppm. In another embodiment, the HTTC compaction is less than or equal to 38 ppm. In another embodiment, the HTTC compaction is less than or equal to 36 ppm. In another embodiment, the HTTC compaction is less than or equal to 30 ppm. In another embodiment, the HTTC compaction is less than or equal to 25 ppm. In another embodiment, the HTTC compaction is less than or equal to 20 ppm.

Low Temperature Test Cycle (LTTC)

Figure 2:
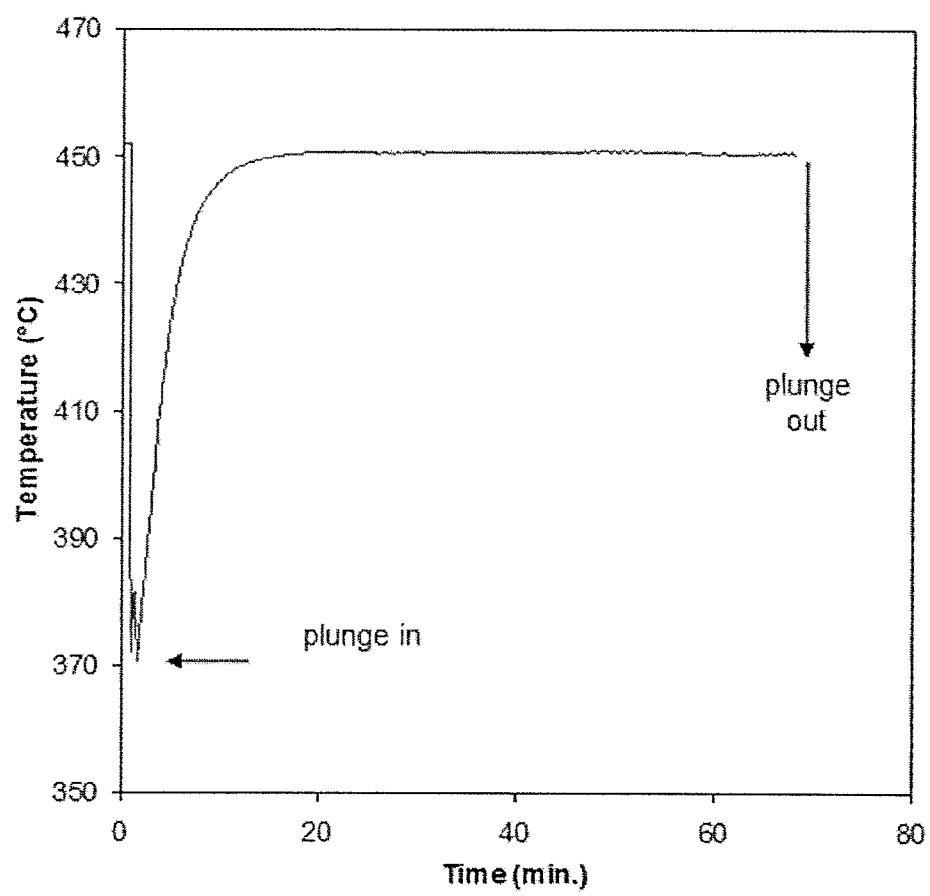
FIG. 2 is a graphical representation of the low thermal temperature cycle as described in the disclosure in terms of temperature over a set time period.

The thermal compaction magnitude resulting from typical TFT array or CF substrate thermal cycles is insufficient to make reliable quality assurance measurements. A 450° C./1 hour thermal cycle is used to achieve a greater compaction signal, enabling the identification of real changes in performance. The furnace is held at just above 450° C. prior to plunging in a stack of five samples (four experimental and one control). The furnace requires approximately 7 minutes recovery time to the target hold temperature. Samples are held at 450° C. for one hour and then plunged out to room temperature. An example thermal trace is shown in FIG. 2. For purposes of this disclosure, this test criteria shall be defined as low temperature test cycle or LTTC. In one embodiment, the LTTC compaction is less than or equal to 5.5 ppm. In another embodiment, the LTTC compaction is less than or equal to 5 ppm. In another embodiment, the LTTC compaction is less than or equal to 4.6 ppm.

Stress Relaxation Test Cycle (SRTC)

The glass plates were cut into beams of 10.00 mm width. The thickness of the glass was maintained at its as-formed thickness (between 0.5 mm and 0.7 mm). The stress relaxation experiment started by loading the glass sample onto two rigid supports placed inside a resistively heated electrical furnace, placing an S-type thermocouple in close proximity to the center of the beam, and adjusting the push rod position. The span length of the two rigid supports was 88.90 mm. The lower end of the push rod was about 5 mm above the surface of the glass at room temperature. The temperature of the furnace was rapidly brought up to the final experimental temperature of 650° C. and idled there for about 5 minutes in order to achieve thermal equilibrium of all parts placed inside the furnace. The experiment continued by lowering the push rod at a rate of 2.54 mm/min and monitoring the signal of the load cell (LC). This was done in order to find a contact of the push rod with the glass beam. Once the LC signal reached 0.1 lb, it triggered an acceleration of the loading rate to 10.16 mm/min. The loading was stopped when the central deflection of the beam reached the final target value (e.g., 2.54 mm), and the program switched from a stress controlled mode to a strain controlled mode. The strain was held constant during the rest of the experiment whereas the stress was variable. The total time from the first contact of the push rod with the glass to the point where the maximum strain of 2.54 mm was achieved was about 12 s. The experiment ended after several hours of data had been collected. It is worth noting that no significant overshoot in temperature was observed at the beginning of the isothermal hold due to careful optimization of the proportional-integral-derivative parameters of the furnace controller.

All the stress relaxation experiments were conducted under isothermal conditions, where the temperature was constantly monitored by an S-type thermocouple placed close to the center of the flat beam of glass. Temperature fluctuations during the experiments did not exceed 0.5° C. Separate experiments regarding the temperature homogeneity across the length of the glassy beam were conducted prior the actual stress relaxation experiments. Temperature homogeneity should not exceed 2° C. at any given experimental time and condition. In principle the stress experiment mimics a classic three point bending experiment where the load is applied on a well-defined center of the beam, deflecting it for 2.54 mm from the original zero line, and then holding it at this constant strain. The central push rod transfers the load (stress) when it comes into the contact with the glassy beam. The end of the central push rod has a knife edge shape, and the width of the wedge is slightly greater than that of the glassy beam. The top-line of the wedge-shaped push rod is perfectly parallel with the surface of the glass beam. Such a configuration assures a homogeneous distribution of the stress across the width of the beam. The push rod is coupled with a linearly variable displacement transducer which controls the displacement. The instrument was also equipped with a well calibrated LC, which maintained the central load applied to the glassy beam during the ongoing relaxation. Due to the nonlinearity of the relaxation process—where the relaxation is initially fast and then gradually slows down—for data recording purposes we split each relaxation experiment into three segments. The first one collected data at 0.5 s intervals; the second segment collected data every 1.0 s, and the third every 10.0 s. Regarding the possibility of stress relaxation during the loading period (i.e., the first 12 s of the experiment) all the loading curves for the glass compositions under study were plotted and in each case the loading curve exhibited a linear stress/strain relationship indicating a primarily elastic response during loading. Hence, the zero time point of the stress relaxation measurements was taken as the time at which the experiment switched from a stress controlled mode to a strain controlled mode, as described above. Percent stress relaxed R during the cycle is defined by $$R = 100\left(1 - \frac{S_{60}}{S_0}\right)$$

where $S_{60}$ is the stress imposed by the controlled push rod at 60 minutes (the end of the SRTC) and $S_0$ is the stress imposed at 0 minutes (the start of the SRTC). For purposes of this disclosure, the above test criteria shall be defined as stress relaxation test cycle (SRTC). In one embodiment, the percent stress relaxed in the SRTC is equal to or less than 50%. In another embodiment, the percent stress relaxed in the SRTC is equal to or less than 45%. In another embodiment, the percent stress relaxed in the SRTC is equal to or less than 40%. In another embodiment, the percent stress relaxed in the SRTC is equal to or less than 35%.

The Test Cycles and TPV

Figure 3:
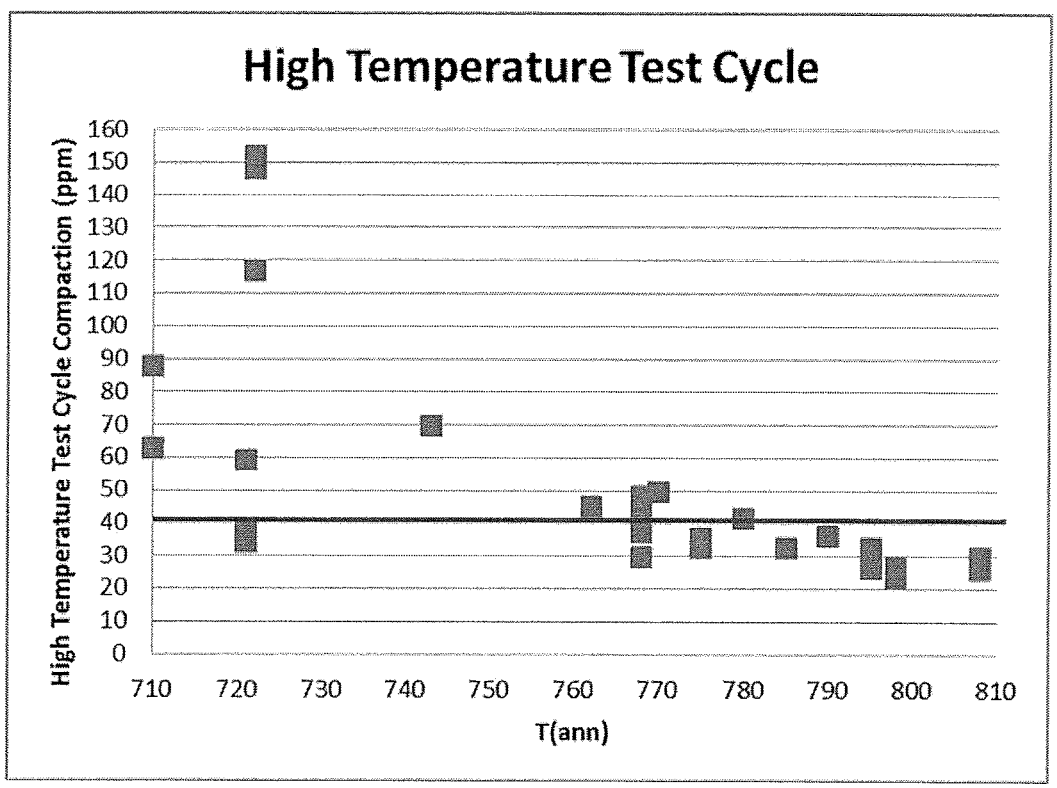
FIG. 3 is a graphical representation of compaction as measured in the High Temperature Test Cycle (HTTC) as a function of annealing points (in C) of studied glasses.

These three measurements are capable of representing the total pitch variability performance of a glass substrate since they capture the primary drivers for total pitch variability under a thermal process: structural relaxation (or compaction) at high and low temperatures and stress relaxation. Historically, the contribution of compaction to total pitch variability has been dominated by high temperature behaviors since registry marks were placed later in customers' TFT processes, making many of the low temperature steps early in these processes irrelevant. This high temperature compaction is described by the HTTC compaction and is reduced by either reducing the cooling rate of the glass ribbon during manufacture, annealing the glass sheet offline, and/or increasing the viscosity of the glass (as captured by T(ann)). FIG. 3 shows a general reduction of compaction as the T(ann) is increased, with the main exceptions being glasses made with significantly different thermal histories (such as via the float process instead of the fusion draw process). This illustrates how glass manufacturers have handled total pitch in the past: they have either slowed cooling rates and/or increased annealing point to suppress compaction in the temperature regime that mattered (i.e. high temperatures).

Figure 4:
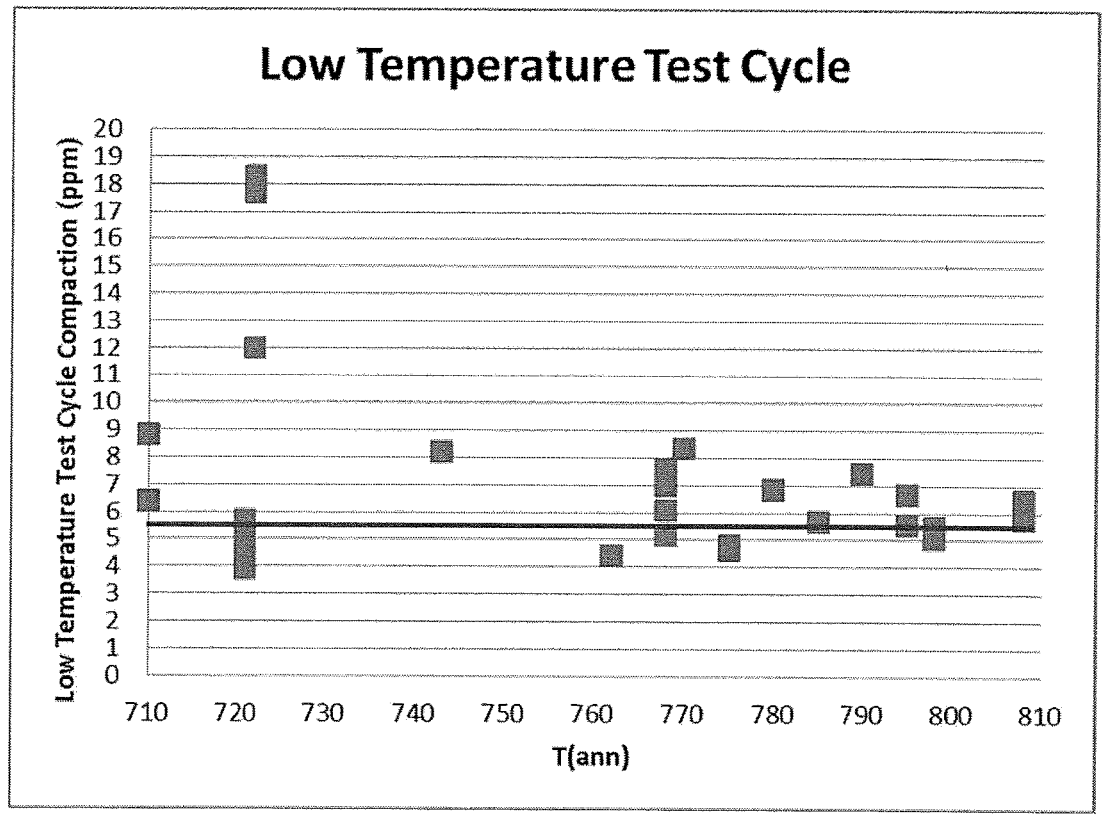
FIG. 4 is a graphical representation of compaction as measured in the Low Temperature Test Cycle (LTTC) as a function of annealing points (in C) of studied glasses.

Recent changes in the TFT market have now forced panel makers to place their registry marks at the beginning of their process, making many previously irrelevant low temperature steps critical to the variability in measured total pitch. As a general rule, compaction at low temperatures (captured by the LTTC in FIG. 4) follows a similar trend as in the HTTC but, at high T(ann) (e.g. greater than 750° C.), the compaction seems to decouple from the T(ann) and become a flat line at roughly 6 ppm. This shows that one of the traditional paths to reducing compaction, increasing T(ann), is no longer a viable solitary solution. The high annealing point glasses that have reduced LTTC compaction in FIG. 4 are the result of the management of a relaxation mechanism in the glass that is operating at a considerably faster rate than would be predicted based on traditional understanding of glass relaxation kinetics. This mechanism has been linked to highly mobile tramp constituents in the glass, such as alkali and water and, additionally, a lower $(MgO+CaO+SrO+BaO)/Al_2O_3$ has been correlated with lower LTTC compaction. Coupling this newfound understanding of a compositional basis for control of this fast relaxation mechanism with optimized cooling curve control has resulted in lower LTTC compaction in certain compositions independent of T(ann) (as evidenced by the high LTTC compaction (5.8 and 6.5 ppm at 0.7 and 0.5 mm, respectively) of Glass 8 (see Table 2) despite a high T(ann)=808° C.). It is quite possible that a glass with excellent HTTC compaction may have unacceptable LTTC compaction due to this decoupling and the simultaneous management of both is important in today's TFT processes.

Figure 5:
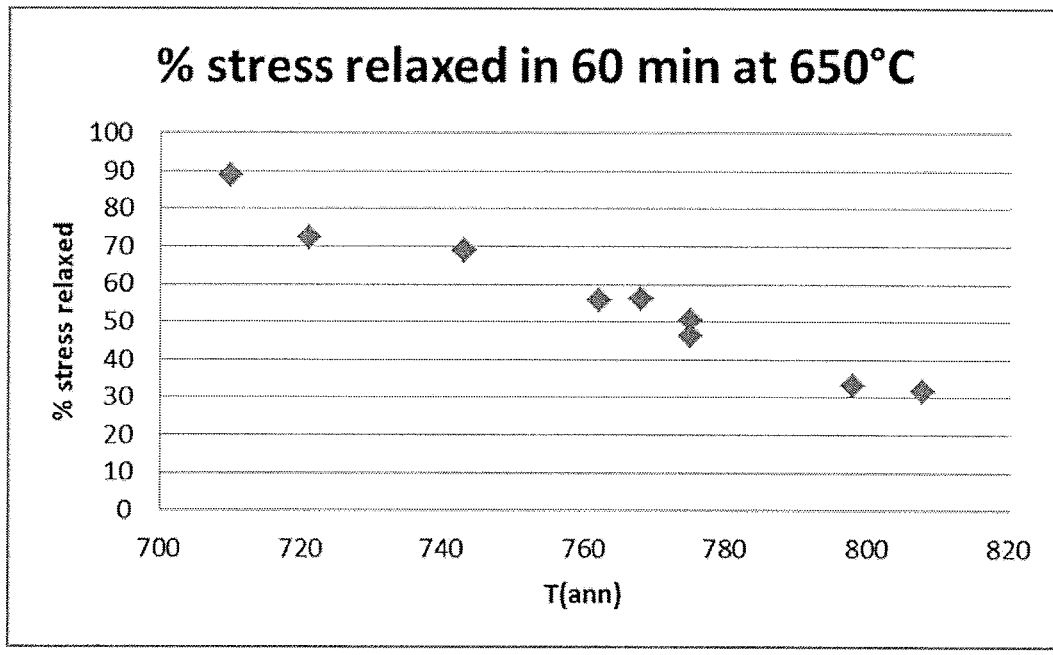
FIG. 5 is a graphical representation of the percent of stress relaxed after the Stress Relaxations Test Cycle (SRTC)—60 minutes at 650 C—plotted as a function of annealing points (in C) of studied glasses. Glasses relaxing less than 50% of the stress are pointed out as key to this disclosure.

In both compaction cycles, glasses cooled with exceptionally slow cooling rates (such as those experienced during the float process) have very good compaction performance, as shown by several of the Glass 2 samples from Table 2. These glasses perform well in old TFT processes but are struggle in the new cycles needed for the highest resolution displays made on large gen sizes. This is due to the other aspect of TPV: stress relaxation, which scales directly with low temperature viscosity. FIG. 5 shows the percent of an induced stress that relaxes in the SRTC, and the virtually linear dependence on T(ann) is clearly observed. This helps explain why lower annealing point glasses with slow quench rates that previously worked for panel makers are no longer viable. In FIG. 5, glasses relaxing less than 50% of the stress satisfy the SRTC criteria of the disclosure.

Figure 6A:
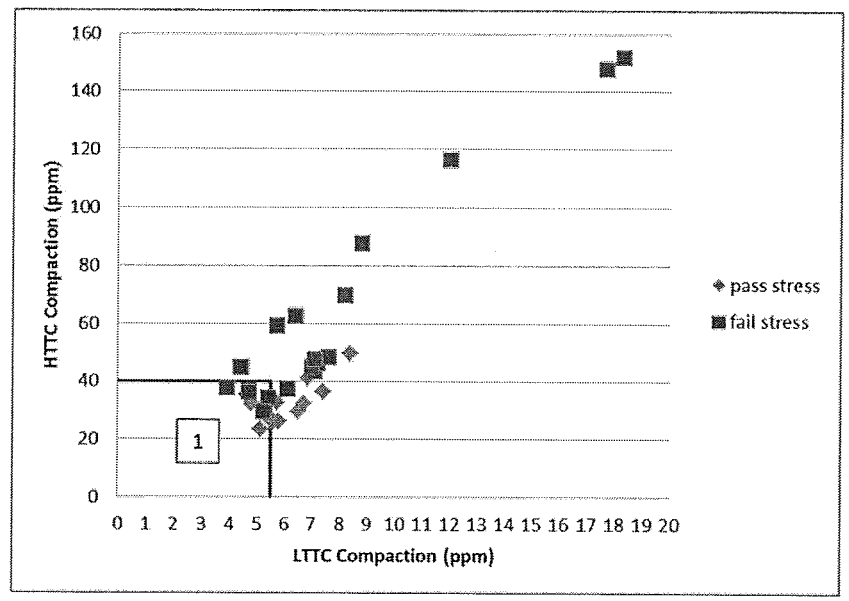
FIG. 6A is a graphical representation of glasses satisfying the compaction aspect of the present disclosure as contained in region "1". Glasses located in region 1 also possess the stress relaxation rates embodied in the disclosure.
Figure 6B:
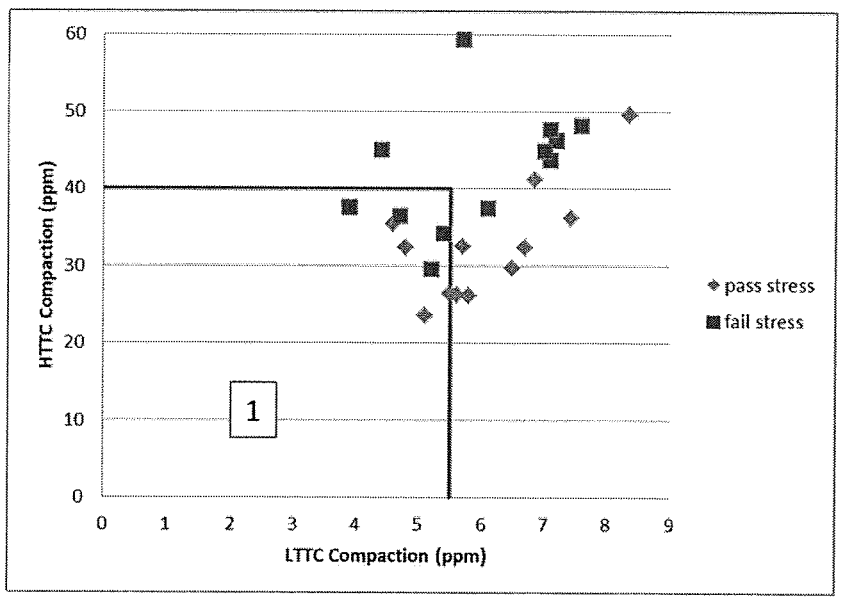
FIG. 6B is a graphical representation showing the enlgaed region "1" from FIG. 6A.

It has been discovered that the management of all three aspects of TPV is advantageous and considerable interactions with many customers have helped us to define the "success criteria" for all three test cycles (indicated by the red lines on FIGS. 3, 4, and 5). FIG. 6a plots the HTTC compaction against the LTTC compaction with glasses satisfying the success criteria falling in Region 1 as identified. Glasses satisfying the stress relaxation requirements are indicated by diamonds while the glasses failing the stress relaxation requirement are indicated by squares. The glasses disclosed in this invention are, therefore, the diamonds that fall within Region 1 (more easily seen in FIG. 6b).

Previously disclosed substrates have attempted to accomplish low TPV through higher annealing points or process control (e.g. slow cooling during manufacture). As evidenced by FIG. 6, these efforts have always resulted in a substrate failing one of these three criteria, thereby rendering the substrate sub-optimal for certain TFT cycles. In addition to these important attributes for TPV, a glass of this disclosure could also be consistent with other attributes advantageous for the manufacture of TFTs (such as low density, high UV transmission, etc.).

TABLE 2

| Glass ID | T(ann) | LTTC Compaction (ppm) | HTTC Compaction (ppm) | SRTC % Relaxed |
|---|---|---|---|---|
| Glass 1 0.5 mm | 798 | 5.1 | 23.6 | 33.3 |
| Glass 2 0.5 mm | 721 | 5.4 | 34.2 | 72.3 |
| Glass 2 0.5 mm | 721 | 4.7 | 36.5 | 72.3 |
| Glass 2 0.5 mm | 721 | 3.9 | 37.6 | 72.3 |
| Glass 2 0.5 mm | 721 | 5.7 | 59.3 | 72.3 |
| Glass 3 0.5 mm | 795 | 6.7 | 32.4 | 33.3 |
| Glass 3 0.7 mm | 795 | 5.6 | 26.3 | 33.3 |
| Glass 4 0.5 mm | 768 | 7.1 | 43.7 | 56.2 |
| Glass 4 0.7 mm | 768 | 7.2 | 46.3 | 56.2 |
| Glass 4 0.63 mm | 768 | 7.6 | 48.2 | 56.2 |
| Glass 4 1.1 mm | 768 | 5.2 | 29.6 | 56.2 |
| Glass 4 0.7 mm | 768 | 6.1 | 37.5 | 56.2 |
| Glass 4 0.5 mm | 768 | 7.0 | 44.9 | 56.2 |
| Glass 4 0.5 mm | 768 | 7.1 | 47.7 | 56.2 |
| Glass 5 0.63 mm | 743 | 8.2 | 69.6 | 69 |
| Glass 6 0.63 mm | 775 | 4.6 | 35.5 | 46.2 |
| Glass 6 0.7 mm | 775 | 4.8 | 32.4 | 46.2 |
| Glass 7 0.7 mm | 798 | 5.5 | 26.4 | 33.3 |
| Glass 8 0.5 mm | 808 | 6.5 | 29.7 | 31.7 |
| Glass 8 0.7 mm | 808 | 5.8 | 26.2 | 31.7 |
| Glass 9 0.7 mm | 785 | 5.7 | 32.5 | |
| Glass 10 0.5 mm | 722 | 12.0 | 116.8 | |
| Glass 10 0.5 mm | 722 | 17.7 | 147.9 | |
| Glass 11 0.63 mm | 722 | 18.3 | 152.0 | |
| Glass 12 0.5 mm | 774 | 8.4 | 49.6 | |
| Glass 13 0.5 mm | 786 | 6.9 | 41.2 | |
| Glass 14 0.5 mm | 791 | 7.4 | 36.3 | |
| Glass 15 0.5 mm | 710 | 6.4 | 62.6 | 88.75 |
| Glass 16 0.5 mm | 710 | 8.8 | 87.8 | 88.75 |
| Glass 17 0.5 mm | 762 | 4.4 | 45.0 | 55.6 |

Table 2 is a sampling of glasses both experimental and commercially available that were tested according to the HTTC, LTTC and SRTC criteria described herein. Glasses 1, 6 and 7 are experimental glasses that were tested and met the criteria as described in one embodiment (HTTC less than or equal to 40 ppm, LTTC less than or equal to 5.5 ppm and SRTC less than 50%). Glasses 2, 4, 9, 10, 11, 15, 16 and 17 represent present or past commercial glasses that were tested and failed the testing criteria as demonstrated by the results. Glasses 5, 8, 12, 13 and 14 are experimental glasses that failed the testing criteria.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass exhibiting the following performance criteria:
   (a) Compaction in the LTTC less than or equal to 5.5 ppm,
   (b) Compaction in the HTTC less than or equal to 40 ppm,
   (c) Less than 50% of an induced stress relaxed in the SRTC,
   wherein the glass comprises:
   a CTE between $28\text{-}42 \times 10^{-7}/°$ C.;
   a Young's' modulus of between 70-90 GPa; and
   an anneal point in excess of 765° C.

2. The glass of claim 1 comprising, in mole percent on an oxide basis: $SiO_2$ 50-85, $Al_2O_3$ 0-20, $B_2O_3$ 0-10, MgO 0-20, CaO 0-20, SrO 0-20, BaO 0-20, where $SiO_2$, $Al_2O_3$, $B_2O_3$, MgO, CaO, SrO and BaO represent the mole percents of the oxide components.

3. The glass of claim 1, wherein $1.05 \leq (MgO+CaO+SrO+BaO)/Al_2O_3 \leq 1.6$, where $Al_2O_3$, MgO, CaO, SrO and BaO represent the mole percents of the oxide components.

4. The glass of claim 1, wherein $As_2O_3$ and $Sb_2O_3$ comprise less than about 0.005 mol %.

5. The glass of claim 1, wherein $Li_2O$, $Na_2O$, $K_2O$, or combinations thereof, comprise less than about 0.1 mol % of the glass.

6. The glass of claim 1 having a specific modulus less than 35.

7. The glass of claim 1 wherein $T_{35k}-T_{liq}>0.25T_{35k}-225°$ C.

8. The glass of claim 1 having an average surface roughness as measured by atomic force microscopy of less than 0.5 nm.

9. The glass of claim 1 having transmission at 300 nm of greater than 50% at a thickness of 0.5 mm.

10. The glass of claim 1 having a density between 2.3 and 2.6 g/cc.

11. A glass comprising:
    a CTE between $28\text{-}42 \times 10^{-7}/°$ C.;
    a Young's' modulus of between 75-85 GPa; and
    a specific modulus less than 35,
    wherein the glass further comprises, in mole percent on an oxide basis: $SiO_2$ 50-85, $Al_2O_3$ 0-20, $B_2O_3$ 0-10, MgO 0-20, CaO 0-20, SrO 0-20, BaO 0-20, where $SiO_2$, $Al_2O_3$, $B_2O_3$, MgO, CaO, SrO and BaO represent the mole percents of the oxide components, and wherein the glass exhibits the following performance criteria:
    (a) Compaction in the LTTC less than or equal to 5.5 ppm,
    (b) Compaction in the HTTC less than or equal to 40 ppm, and
    (c) Less than 50% of an induced stress relaxed in the SRTC.

12. The glass of claim 11, wherein $1.05 \leq (MgO+CaO+SrO+BaO)/Al_2O_3 \leq 1.6$, where $Al_2O_3$, MgO, CaO, SrO and BaO represent the mole percents of the oxide components.

13. The glass of claim 11, wherein $As_2O_3$ and $Sb_2O_3$ comprise less than about 0.005 mol %.

14. The glass of claim 11, wherein $Li_2O$, $Na_2O$, $K_2O$, or combinations thereof, comprise less than about 0.1 mol % of the glass.

15. The glass of claim 11 having an anneal point in excess of 765° C.

16. The glass of claim 11 wherein $T_{35k}-T_{liq}>0.25T_{35k}-225°$ C.

17. The glass of claim 11 having an average surface roughness as measured by atomic force microscopy of less than 0.5 nm.

18. The glass of claim 11 having transmission at 300 nm of greater than 50% at a thickness of 0.5 mm.

19. The glass of claim 11 having a density between 2.3 and 2.6 g/cc.

20. A glass comprising:
    a Young's' modulus of between 75-85 GPa;
    a specific modulus less than 35; and
    an anneal point in excess of 765° C.,
    wherein the glass exhibits the following performance criteria:
    (a) Compaction in the LTTC less than or equal to 5.5 ppm,
    (b) Compaction in the HTTC less than or equal to 40 ppm, and
    (c) Less than 50% of an induced stress relaxed in the SRTC.

21. The glass of claim 20 wherein $T_{35k}-T_{liq}>0.25T_{35k}-225°$ C.

22. The glass of claim 20 having an average surface roughness as measured by atomic force microscopy of less than 0.5 nm.

23. The glass of claim 20 having transmission at 300 nm of greater than 50% at a thickness of 0.5 mm.

24. The glass of claim 20 having a CTE between $28\text{-}42 \times 10^{-7}/°$ C.

25. A glass comprising:
    a Young's' modulus of between 75-85 GPa;
    a specific modulus less than 35; and
    a strain point greater than 700° C.,
    wherein the glass exhibits the following performance criteria:
    (a) Compaction in the LTTC less than or equal to 5.5 ppm,
    (b) Compaction in the HTTC less than or equal to 40 ppm, and
    (c) Less than 50% of an induced stress relaxed in the SRTC.

26. The glass of claim 25, wherein the strain point is between 700° C. and 800° C.

27. The glass of claim 25 wherein $T_{35k}-T_{liq}>0.25T_{35k}-225°$ C.

28. The glass of claim 25 having an average surface roughness as measured by atomic force microscopy of less than 0.5 nm.

29. The glass of claim 25 having a CTE between $28\text{-}42 \times 10^{-7}/°$ C.

* * * * *

UNITED STATES PATENT AND TRADEMARK OFFICE
CERTIFICATE OF CORRECTION

PATENT NO. : 9,573,839 B2  
APPLICATION NO. : 15/048452  
DATED : February 21, 2017  
INVENTOR(S) : Douglas Clippinger Allan et al.

Page 1 of 1

It is certified that error appears in the above-identified patent and that said Letters Patent is hereby corrected as shown below:

In the Claims

In Column 28, Line 6, Claim 16, delete "$T_{35k}T_{liq}$" and insert -- $T_{35k}$-$T_{liq}$ --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*